(12) United States Patent  (10) Patent No.: US 9,083,247 B2
Choi  (45) Date of Patent: Jul. 14, 2015

(54) SYNCHRONOUS RECTIFIER CONTROL TECHNIQUES FOR A RESONANT CONVERTER

(75) Inventor: Hangseok Choi, Bedford, NH (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/508,649

(22) PCT Filed: Apr. 25, 2012

(86) PCT No.: PCT/US2012/034955
§ 371 (c)(1),
(2), (4) Date: Aug. 15, 2012

(87) PCT Pub. No.: WO2012/148992
PCT Pub. Date: Nov. 1, 2012

(65) Prior Publication Data
US 2014/0043865 A1   Feb. 13, 2014

Related U.S. Application Data

(60) Provisional application No. 61/478,739, filed on Apr. 25, 2011.

(51) Int. Cl.
*H02M 3/335* (2006.01)
*H02M 1/32* (2007.01)

(52) U.S. Cl.
CPC ............ *H02M 3/33507* (2013.01); *H02M 1/32* (2013.01)

(58) Field of Classification Search
USPC ............... 363/21.03, 16, 21.02, 21.12, 21.14, 363/21.06, 21.07, 127, 21.01, 17, 89, 90, 363/15, 26, 41, 50, 132
See application file for complete search history.

(56) References Cited

U.S. PATENT DOCUMENTS 5,038,266 A * 8/1991 Callen et al. ..................... 363/89
5,841,641 A * 11/1998 Faulk .......................... 363/21.14

(Continued)

FOREIGN PATENT DOCUMENTS

CN   101753032   6/2010
WO   2010092843  8/2010

OTHER PUBLICATIONS

International Rectifier, IR1167ASPbF, IR1167BSPbF, SmartRectifier (TM) Control IC, Jan. 2009,16 pages.

(Continued)

*Primary Examiner* — Matthew Nguyen
*Assistant Examiner* — Trinh Dang
(74) *Attorney, Agent, or Firm* — Grossman Tucker; Perreault & Pfleger PLLC (57) ABSTRACT

A resonant converter system includes a first stage having inverter circuitry and resonant tank circuitry configured to generate an AC signal from a DC input signal, a transformer configured to transform the AC signal, and a second stage. The second stage features synchronous rectifier (SR) circuitry including a plurality of SR switches each having a body diode and SR control circuitry. SR control circuitry is configured to generate gate control signals to control the conduction state of the SR switches so that the body diode conduction time is minimized and a negative current across the SR switches is reduced or eliminated. The method includes controlling the conduction state of SR switches to conduct as the body diode associated with the switch begins to conduct and controlling the SR switch to turn off as the current through the switch approaches a zero crossing.

11 Claims, 5 Drawing Sheets

(56) References Cited

U.S. PATENT DOCUMENTS

| | | |
|---|---|---|
| 6,297,970 B2 | 10/2001 | Hemena et al. |
| 6,301,128 B1 | 10/2001 | Jang et al. |
| 6,396,250 B1 | 5/2002 | Bridge |
| 6,934,167 B2 | 8/2005 | Jang et al. |
| 7,206,208 B1 | 4/2007 | Hsu et al. |
| 7,558,083 B2* | 7/2009 | Schlecht .................. 363/21.06 |
| 8,368,374 B2 | 2/2013 | Hachiya et al. |
| 2007/0263421 A1* | 11/2007 | Kyono ........................ 363/127 |
| 2008/0055942 A1* | 3/2008 | Tao et al. .................. 363/21.03 |
| 2008/0285312 A1* | 11/2008 | Fu et al. .................... 363/21.06 |
| 2009/0097280 A1* | 4/2009 | Wu et al. ........................ 363/17 |
| 2009/0251925 A1* | 10/2009 | Usui et al. ...................... 363/16 |
| 2009/0257250 A1 | 10/2009 | Liu |
| 2010/0054008 A1* | 3/2010 | Schaible et al. ............. 363/127 |
| 2010/0142229 A1 | 6/2010 | Chen et al. |

OTHER PUBLICATIONS

International Search Report and Written Opinion dated Aug. 6, 2012 issued in PCT Patent Application No. PCT/US2012/034955, 14 pages.

* cited by examiner

SYNCHRONOUS RECTIFIER CONTROL TECHNIQUES FOR A RESONANT CONVERTER

CROSS-REFERENCE TO RELATED APPLICATION

This application is a National Stage of International PCT Application No. PCT/US2012/034955 filed on Apr. 25, 2012, which claims the benefit of U.S. Provisional Patent Application Ser. No. 61/478,739 filed on Apr. 25, 2011, both of which are fully incorporated herein by reference.

FIELD

The present disclosure relates to a DC/DC converter system, and more particularly, to synchronous rectifier control techniques for a resonant converter.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure provides control techniques for a resonant converter. In one control technique, the switches of the rectifier portion of the resonant converter are controlled to emulate a diode, e.g., each switch is controlled to conduct as the body diode of the switch begins to conduct, and each switch is controlled to turn off as the current through the switch approaches a zero crossing. In this manner, the forward bias of each switch can be controlled so that the voltage drop across the switch is much less than a conventional diode forward voltage drop, while still enabling protection of the circuit by preventing negative currents through a synchronous rectifier switch. This control technique may predict gate drive signals based on previous conduction times of the synchronous rectifier switches, and iteratively add or subtract delay to or from the gate drive signals so that the falling edge of the gate drive signal substantially matches the zero crossing point of current through the switch. This predictive technique may be used when the switching frequency of an inverter stage is at or below a resonant frequency (f0) to compensate for variability in component tolerances and/or errors introduced from circuit components. When the switching frequency of the inverter stage is above the resonant frequency (f0), the synchronous rectifier switches continue to conduct after the switches in the inverter stage are turned off and the synchronous conduction time is mainly determined by the switching frequency of the inverter stage. This can create negative current through the rectifier switches when controlling the synchronous rectifier only based on the synchronous conduction time of the previous switching cycle, and thus, in another control technique, the switches of the rectifier portion are controlled based on a clock signal used to control the conduction state of the inverter stage switches to compensate for a truncated resonant period, e.g., each rectifier switch is controlled so that the conduction state of the rectifier switch is less than or equal to the truncated zero crossing point of the current through the rectifier switch. Each of these control techniques may be employed simultaneously to enable current protection through all operational frequencies.

Figure 1:
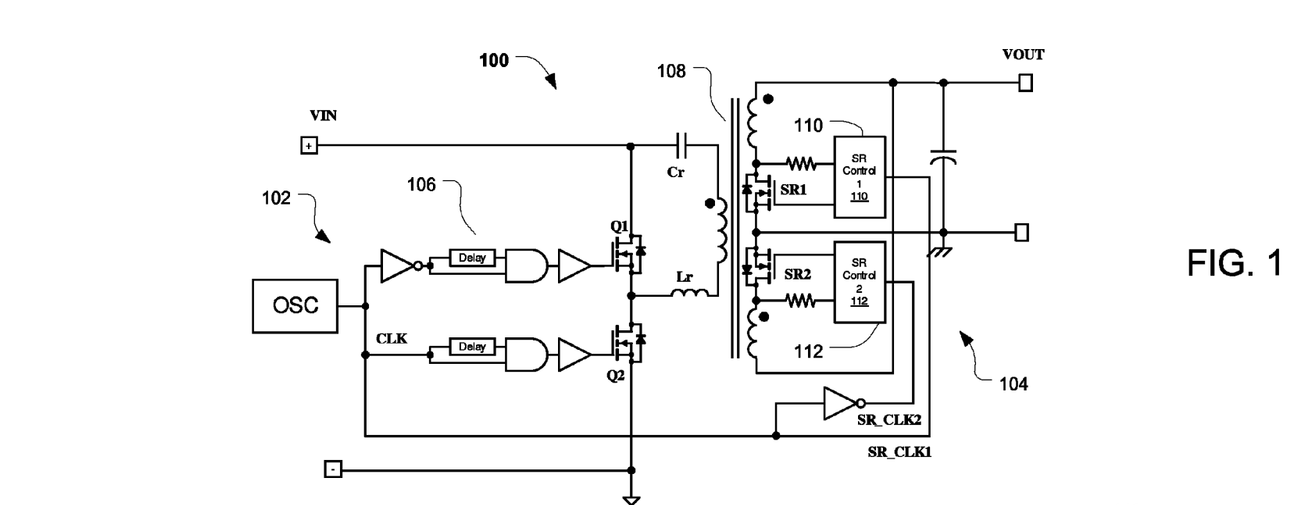
FIG. 1 illustrates a resonant converter system consistent with various embodiments of the present disclosure.

FIG. 1 illustrates a resonant converter system 100 consistent with various embodiments of the present disclosure. The converter system 100 of FIG. 1 includes a primary side stage 102 that includes inverter circuitry and a secondary side stage 104 that includes synchronous rectifier circuitry, and the system 100 generally operates as a DC/DC resonant converter circuit that receives an input DC voltage (VIN) and generates an output DC voltage (VOUT). The inverter circuitry of the primary side 102, in one embodiment, includes two switches Q1 and Q2 arranged in a half bridge configuration. The conduction state of the switches Q1 and Q2 are controlled by the gate control circuitry 106 that includes a controllable oscillator (OSC) that sets on/off frequency for each of the switches. The switch control circuitry 106 may also include delay mechanisms (e.g., DELAY, as shown) to prevent each switch from simultaneously conducting. A resonant tank circuit that includes the transformer 108, resonant capacitor Cr and resonant inductor Lr operates to generate a sinusoidal waveform from the square wave produced by the switches Q1 and Q2. The resonant frequency (f0) of the system 100 is generally controlled by the resonant capacitor Cr and resonant inductor Lr. Generally, the gain of the DC/DC converter system 100 may be controlled by the switching frequency (fs) of the switches Q1 and Q2 in relation to the resonant frequency (f0). In some embodiments, the gain of the system 100 is larger when fs<f0 and smaller when fs>f0. Of course, in other embodiments the inverter circuitry may include, for example, a full bridge inverter topology, a push-pull inverter topology, Class C inverter topology, etc.

The synchronous rectifier circuitry of the secondary side stage 104 includes rectifier switches SR1 and SR2 electrically coupled to the secondary side of the transformer 108 and configured to operate as a full wave rectifier of the sinusoidal signal at the secondary side of the transformer 108. The SR switches may include MOSFET devices that include body diodes biased in a source to drain direction (as shown). The conduction state of switch SR2 may be controlled by synchronous rectifier (SR) control circuitry 110 and the conduction state of switch SR1 may be controlled by SR control circuitry 112. In general, SR control circuitry 110 and 112 are configured to generate gate control signals to control the conduction of SR2 and SR1, respectively, so that the body diode conduction time is minimized and so that negative current across the SR switches is reduced or eliminated, as described below.

Figure 2:
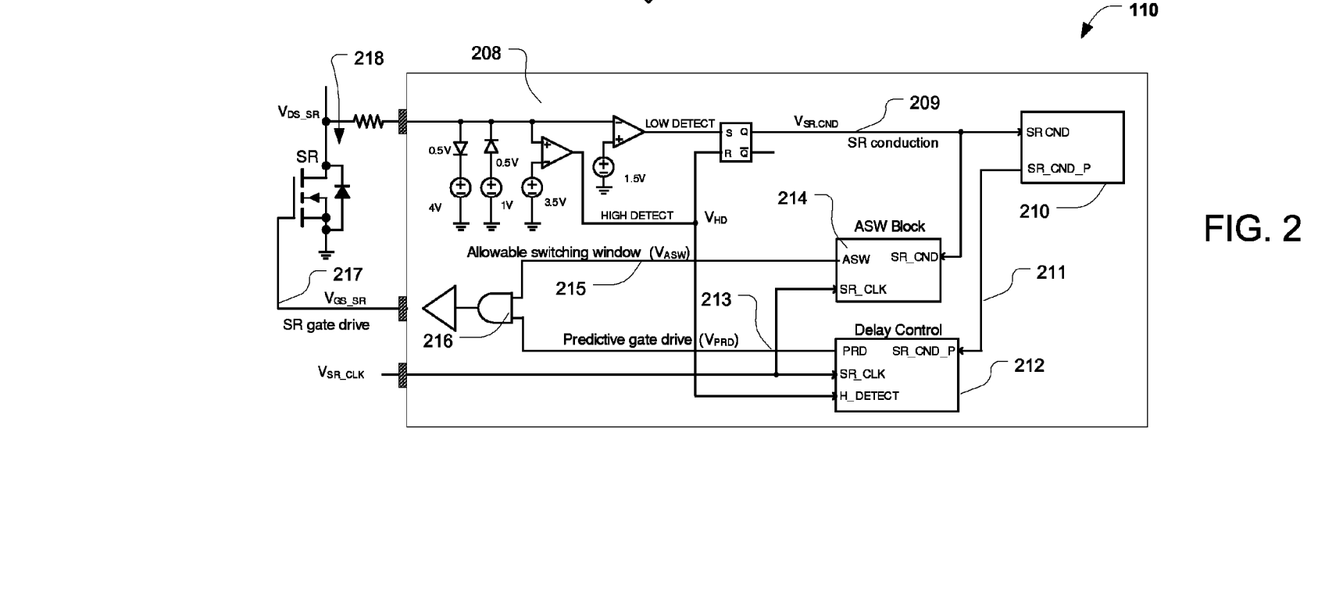
FIG. 2 illustrates synchronous rectifier control circuitry consistent with one embodiment of the present disclosure.

FIG. 2 illustrates synchronous rectifier control circuitry 110 consistent with one embodiment of the present disclosure. It should be understood at the outset that since control circuitry 110 and 112 are generally configured to generate complimentary gate control signals, the operation of circuitry 110 is similar to the operation of 112, except that circuitry 112 is timed from an inverted clock signal (SR_CLK2) as shown in FIG. 1. Thus, the following description of control circuitry 110 applies equally to circuitry 112, except the gate control signals generated by circuitry 110 are approximately 180 degrees out of phase from the gate control signals of circuitry 112. The inputs to the SR control circuitry 110 include the drain voltage of the SR switch (VDS_SR) and the clock signal from the oscillator (OSC). The SR control circuitry 110 includes zero crossing approximating circuitry 208 configured to generate an SR conduction signal 209 indicative of the conduction state of the SR switch. When the SR switch is conducting, the voltage drop across the switch is near zero volts, and when the SR switch is open, the voltage drop across the SR switch is high (typically greater than the voltage drop across the body diode 218 of the SR switch). The SR control circuitry 110 also includes sample and hold circuitry 210 configured to sample the conduction time (as indicated by signal 209). To prevent the current flowing through the SR switch from crossing zero, the sample and hold circuitry is also configured to generate a proportional SR conduction signal 211 (SR_CND_P). Signal 211 is generated as a fraction of signal 209, for example, signal 211 may be 90% of the conduction time indicated by signal 209.

The SR control circuitry 110 also includes delay control circuitry 212 configured to add or subtract a predetermined delay time to the falling edge of signal 211 to generate a predictive gate control signal 213 (VPRD). The delay control circuitry 212 utilizes the clock signal and a high detect signal (generated by the circuitry 208 and generally indicative of when the drain voltage of the SR switch is high). The predictive gate control signal 213 is generated based on the conduction time of the SR switch in a previous conduction cycle. Thus, if the conduction time of the SR switch in the current switch cycle is too long (such that the current through the switch crosses zero), delay control circuitry 212 may reduce the delay time of signal 213 so that the conduction time of the SR switch in the next cycle is shortened. Conversely, if the conduction time of the SR switch in the current switch cycle is too short (such that a dead time exists where the SR switches opens before the current through the switch crosses zero), delay control circuitry 212 may add more delay to signal 213 so that the conduction time of the SR switch in the next cycle is longer.

The sample and hold circuitry 210 and the delay control circuitry 212 may ensure that the current through the SR switch does not cross zero, but is permitted to complete its resonant cycle as determined by f0. Thus, when switching in the inverter stage 102 occurs at or below f0, the delay control circuitry 212 may be configured to add (or subtract) delay from the SR conduction signal 209 to achieve switching of the SR switch at or near the zero crossing point of current through the switch. When switching in the inverter stage occurs above f0, inverter switch (Q1 or Q2) will turn off before the corresponding SR switch (which means that the resonance period in the resonance tank is cut short or truncated). Accordingly, in some embodiments, the SR control circuitry 110 may also include allowable switching window (ASW) circuitry 214 configured to generate an ASW signal 215 based the time difference between the turn-off of the inverter stage switch (as set by the clock signal OSC) and the end of the SR conduction time. Accordingly, the ASW circuitry 214 is configured to receive the clock signal (OSC) from the primary stage 102 and the SR conduction signal 209 and determine the time difference between the end of the clock signal and the end of the SR conduction signal 209. The ASW signal 215 is generated that includes delay time added to the clock signal so that the ASW signal 215 approximates the end of the SR conduction signal 209. Similar to the predictive gate drive signal 213, the ASW signal 215 may be generated using iterative techniques, e.g., the ASW signal 215 may be based on the conduction time of the SR switch in a previous conduction cycle. The SR control circuitry 110 may also include AND gate circuitry 216 configured to AND the ASW signal 215 with the predictive gate drive signal 213 to generate the SR gate drive signal 217.

Figure 3:
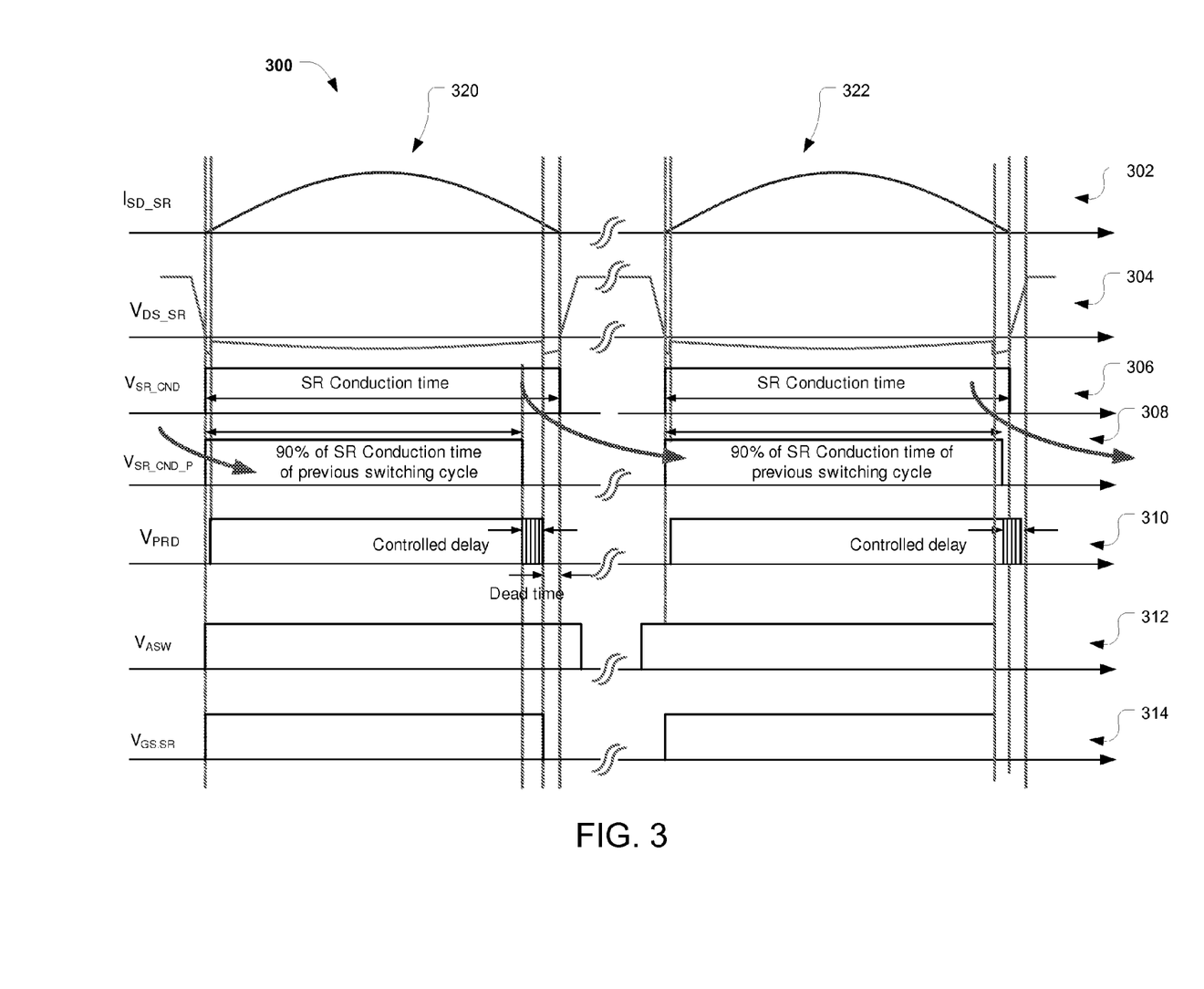
FIG. 3 illustrates timing diagrams of various signals consistent with one embodiment of the present disclosure.

FIG. 3 illustrates a timing diagram 300 of various signals consistent with one embodiment of the present disclosure. This timing diagram is generally broken into two parts: the left side 320 is the nth conduction cycle and the right side 322 is the (nth+1) conduction cycle. The current waveform 302 depicts current through an SR switch, designated as ISD_SR. The voltage waveform 304 depicts the drain to source voltage drop across the SR switch, designated as VDS_SR. In the first part of the voltage waveform 304, the switch is closed and hence the voltage drop across the switch is high. When the current begins to flow through the SR switch, the body diode 218 of the switch begins to conduct, and the voltage drop across the switch decreases rapidly. At this point, to minimize the period of time that the body diode 218 is conducting, it is advantageous to control the SR switch to close switch and begin conduction through the switch. The total SR conduction time waveform 306 closely matches the zero crossing points of the current waveform 302 and the voltage waveform 304. The SR conduction time 306 is measured in the nth cycle 320 and a proportional SR conduction waveform 308 is generated as a substantial fraction of the SR conduction time 306, and applied to the next conduction cycle 322 (as indicated by the arrow). The predictive gate drive waveform 310 is generated to, in this example, add delay to the falling edge of the proportional SR conduction waveform 308 to minimize the dead time between the proportional SR conduction signal waveform 308 and the actual SR conduction time 306. Of course, if too much delay is added, in the next conduction cycle delay may be subtracted from the proportional SR conduction signal 308 so that the predictive gate drive waveform 310 substantial matches the SR conduction time 306. This process may continue iteratively. Also depicted are the ASW waveform 312 and the gate drive signal waveform 314.

Figure 4A:
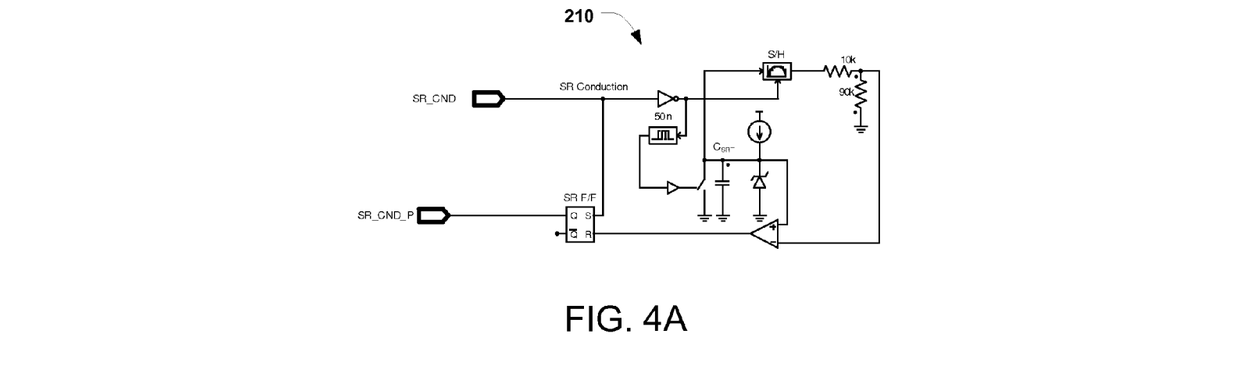
FIG. 4A illustrates sample and hold circuitry consistent with one embodiment of the present disclosure.
Figure 4B:
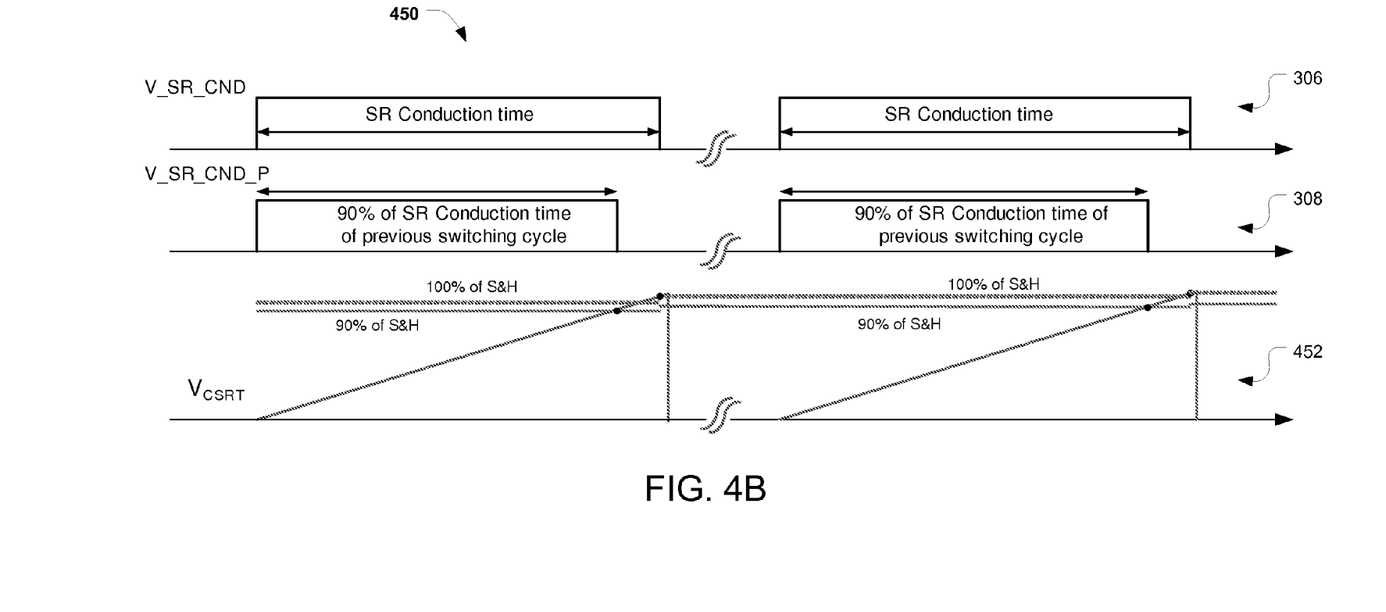
FIG. 4B illustrates timing diagrams of various signals in connection with the operation of the sample and hold circuitry of FIG. 4A.

FIG. 4A illustrates sample and hold circuitry 210 consistent with one embodiment of the present disclosure. With continued reference to FIG. 2, the sample and hold circuitry 210 of this embodiment is configured to receive and sample the SR conduction signal (209) by charging the sampling capacitor CSRT. The proportional SR conduction 211 is generated as a selected fraction of the SR conduction signal 209. FIG. 4B illustrates timing diagrams 450 of various signals in connection with the operation of the sample and hold circuitry of FIG. 4A. The SR conduction signal waveform and the proportional SR conduction signal waveform are depicted as 306 and 308, respectively. Waveform 452 depicts the voltage ramp up of the sampling capacitor CSRT (VCRST), and also depicts a 90% threshold for generating the proportional SR conduction signal.

Figures 5A, 5B:
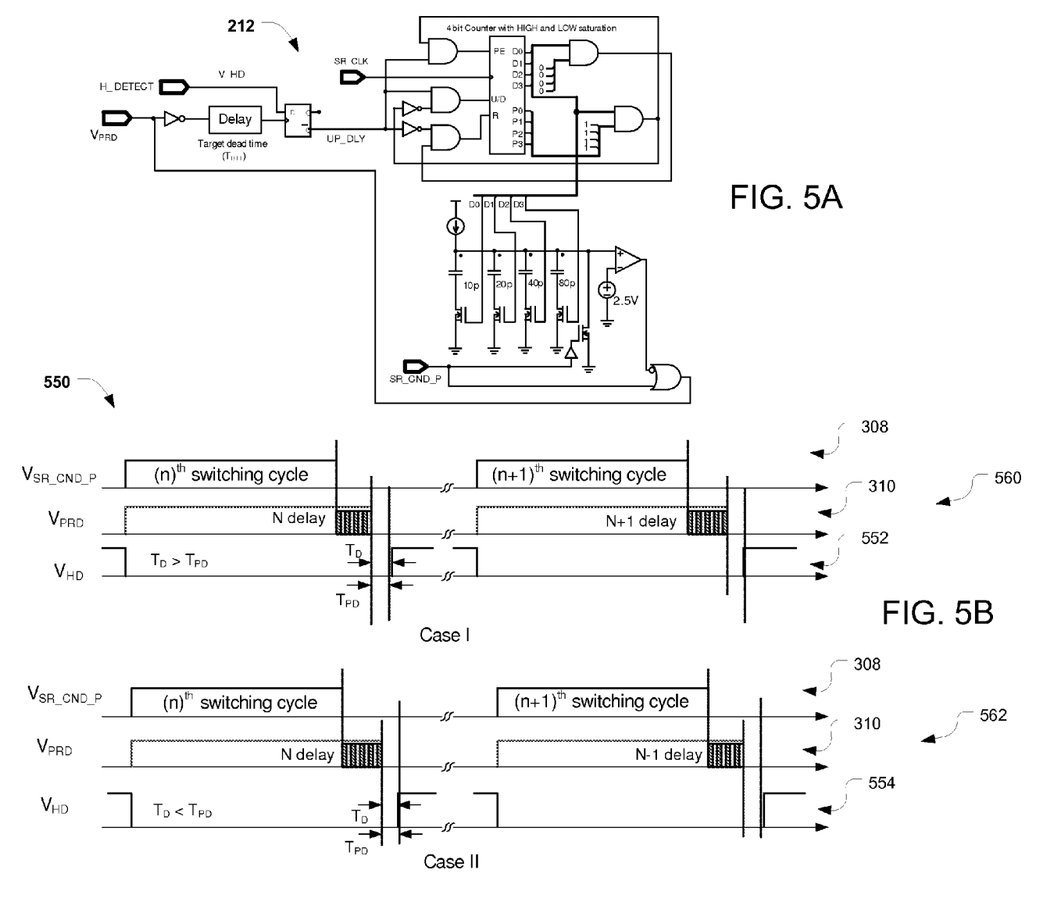
FIG. 5A illustrates delay control circuitry consistent with one embodiment of the present disclosure.
FIG. 5B illustrates timing diagrams of various signals in connection with the operation of the delay control circuitry of FIG. 5A.

FIG. 5A illustrates delay control circuitry 212 consistent with one embodiment of the present disclosure. With continued reference to FIG. 2, the delay control circuitry 212 is configured to generate the predictive gate drive signal 213 to add (or subtract) selected delay time periods to the end (falling edge) of the proportional SR conduction signal 211, based on the SR conduction ON time, as indicated by the high detect signal. The delay control circuitry 212 of this embodiment includes a 4-Bit weighted counter configured to impart selectable delay times to the end of the proportional SR conduction signal 211. FIG. 5B illustrates timing diagrams of various signals in connection with the operation of the delay control circuitry of FIG. 5A. The first set of timing diagrams 560 illustrate the case when the dead time (TD) is larger than a programmed or predetermined dead time (TPD), and thus delay is added. For example, waveform 308 depicts the proportional SR conduction signal and waveform 310 depicts the predictive gate drive signal that includes added delay to minimize the dead time. The second set of timing diagrams 562 illustrate the case when the dead time (TD) is smaller than a programmed or predetermined dead time (TPD), and thus delay is subtracted. For example, waveform 308 depicts the proportional SR conduction signal and waveform 310 depicts the predictive gate drive signal that includes less delay (in the nth+1 cycle, as compared to the nth cycle) to minimize the ensure that SR switching does not occur past the zero crossing point of the current through the SR switch.

Figure 6A:
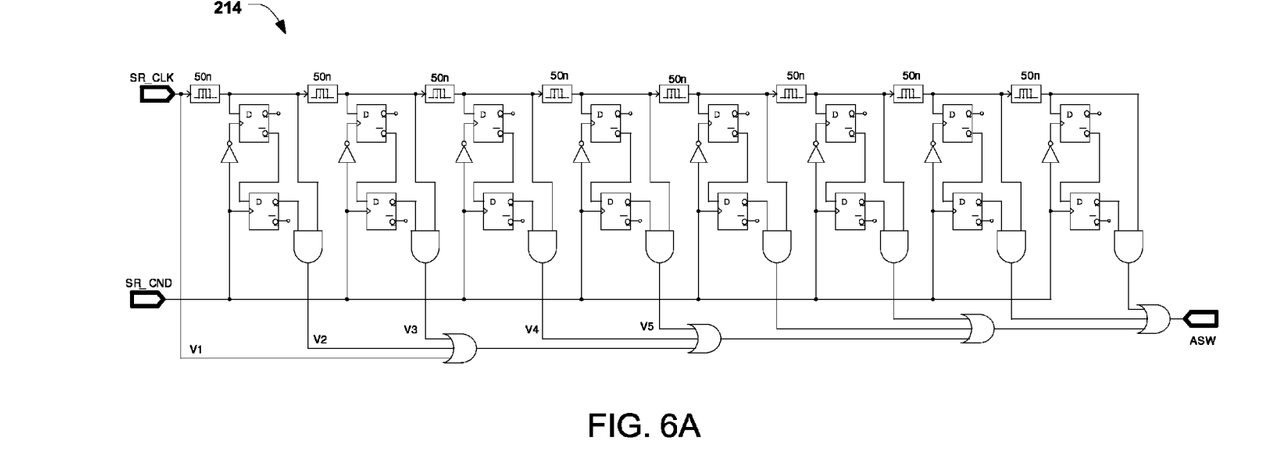
FIG. 6A illustrates delay selector circuitry consistent with one embodiment of the present disclosure.

FIG. 6A illustrates ASW circuitry 214 consistent with one embodiment of the present disclosure. In this embodiment, the ASW circuitry 214 includes delay selector circuitry 212 configured to control the timing of the gate control signal 217 when the switches in the inverter stage 202 operate above the resonant frequency of the resonant tank circuit. With continued reference to FIG. 2, the ASW circuitry 214 is configured to generate the ASW signal 215 by measuring the time difference between the turn-off of the inverter stage switch (as set by the clock signal OSC) and the end of the SR conduction time, and to the extent there is any difference, adding selectable units of delay time to the end (falling edge) of the clock signal to generate the ASW signal 215. The delay selector circuitry, in this example, includes a plurality of selectable delay circuits, each of which may add a predetermined amount of delay to the falling edge of the clock signal. The delay times may be added, so additional delay may be generated by enabling more delay circuits and less delay may be generated by enabling less delay circuits. Each delay circuit may be configured to generate the same delay time, or different (e.g., weighted) delay time.

Figure 6B:
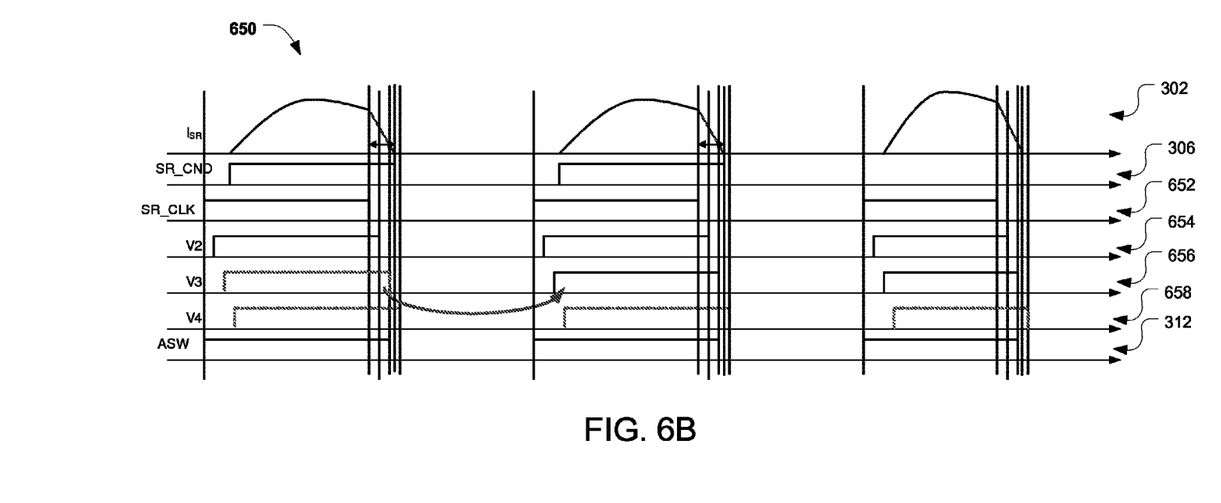
FIG. 6B illustrates timing diagrams of various signals in connection with the operation of the delay selector circuitry of FIG. 6A.

FIG. 6B illustrates timing diagrams 650 of various signals in connection with the operation of the delay selector circuitry of FIG. 6A. The current waveform 302 illustrates that the timing of the inverter stage switches (indicated by the clock waveform 652) is ended before the resonant period, i.e., fs>f0. The portion of the current waveform 302 shown at the trailing end of the signal between the end of waveform 652 and the end of waveform 306 indicates a generally linear current waveform. Waveform 654 illustrates a first delay time period generated by one of the delay circuits. Similarly, waveforms 656 and 658 illustrate delay time periods generated by second a third circuits, respectively. Note that adding delay time period of waveform 658 would cause the ASW signal 312 to end after the current waveform. Thus, in this example, to prevent zero crossing of the current through the SR switch, delay time periods 654 and 656 may be added to the clock signal 652 to generate the ASW signal 312.

According to one aspect, the present disclosure features a resonant converter system. The resonant converter system includes a first stage, a transformer, and a second stage. The first stage includes inverter circuitry and resonant tank circuitry configured to generate an AC signal from a DC input signal. The transformer is configured to transform the AC signal. The second stage includes synchronous rectifier (SR) circuitry that includes a plurality of SR switches each having a body diode. The SR control circuitry is configured to generate gate control signals to control the conduction state of the SR switches so that the body diode conduction time is minimized and a negative current across the SR switches is reduced or eliminated.

According to another aspect, the present disclosure features a method including inverting a DC input signal to an AC inverted signal having a first voltage; transforming the AC inverted signal to an AC transformed signal having a second voltage; and rectifying the second AC transformed signal to a DC output voltage signal, wherein the rectifying includes controlling a conduction state of a plurality of synchronous rectifier (SR) switches each having a body diode so that the body diode conduction time is minimized and a negative current across the SR switches is reduced or eliminated.

According to yet another aspect, the present disclosure features a method of controlling a resonant converter. The method includes controlling a conduction state of a plurality of synchronous rectifier (SR) switches of a rectifier portion of the resonant converter, each of the SR switches having a body diode, wherein each switch is controlled to conduct as the body diode associated with the switch begins to conduct, and each switch is controlled to turn off as the current through the switch approaches a zero crossing.

The term "switches" may be embodied as MOSFET switches (e.g. individual NMOS and PMOS elements), BJT switches and/or other switching circuits known in the art. In addition, "circuitry" or "circuit", as used in any embodiment herein, may comprise, for example, singly or in any combination, hardwired circuitry, programmable circuitry, state machine circuitry, and/or circuitry that is included in a larger system, for example, elements that may be included in an integrated circuit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A resonant converter system, comprising:
 a first stage comprising an inverter circuitry and a resonant tank circuitry configured to generate an AC signal from a DC input signal;
 a transformer configured to transform the AC signal;
 a second stage comprising a synchronous rectifier (SR) circuitry that includes a plurality of SR switches and each switch includes a body diode, and SR control circuitry configured to generate gate control signals to control a conduction state of the SR switches so that a body diode conduction time is minimized and a negative current across the SR switches is reduced or eliminated, wherein the SR control circuitry comprises:

a zero crossing approximating circuitry configured to generate an SR conduction signal indicative of the conduction state of the SR switch; and an allowable switching window (ASW) circuitry configured to generate an ASW signal based on a time difference between the turn-off of a switch in the first stage and the end of the SR conduction signal.

2. The system of claim 1, further comprising sample and hold circuitry configured to sample the conduction time of the SR conduction signal and further configured to generate a proportional SR conduction signal that is proportional to the SR conduction signal.

3. The system of claim 2, further comprising delay control circuitry configured to add or subtract a predetermined delay time to the falling edge of the proportional SR conduction signal and further configured to generate a predictive gate control signal.

4. The system of claim 3, further comprising an AND gate configured to AND the ASW signal and the predictive gate control signal to generate an SR gate drive signal to control the conduction state of the SR switch.

5. A method, comprising:

inverting a DC input signal to an AC inverted signal having a first voltage;

transforming the AC inverted signal to an AC transformed signal having a second voltage;

rectifying the second AC transformed signal to a DC output voltage signal, wherein the rectifying includes controlling a conduction state of a plurality of synchronous rectifier (SR) switches each having a body diode so that the body diode conduction time is minimized and a negative current across the SR switches is reduced or eliminated;

generating a plurality of SR conduction signals based on a zero crossing approximation, each SR conduction signal indicative of a conduction state of a respective one of the plurality of SR switches; and generating an allowable switching window (ASW) signal based on, at least in part, a time difference between an end of a clock signal OSC and an end of the SR conduction signal.

6. The method of claim 5, further comprising generating a proportional SR conduction signal that is proportional to the SR conduction signal.

7. The method of claim 6, further comprising adding or subtracting a predetermined delay time to a falling edge of the proportional SR conduction signal to generate a predictive gate control signal.

8. The method of claim 7, wherein the DC input signal is inverted to the AC inverted signal using inverter circuitry and resonant tank circuitry, the method further comprising generating an SR gate drive signal to control the conduction state of the SR switch, wherein the SR gate drive signal is based on the predictive gate control signal when a switching frequency (fs) of the inverter circuitry is at or below resonant frequency (f0), and wherein the SR gate drive signal is based on the ASW signal when fs is above f0.

9. A method of controlling a resonant converter, the method comprising:

controlling a conduction state of a plurality of synchronous rectifier (SR) switches of a rectifier portion of the resonant converter, each of the SR switches having a body diode, wherein each switch is controlled to conduct as the body diode associated with the switch begins to conduct, and each switch is controlled to turn off as a current through the switch approaches a zero crossing; and iteratively adding or subtracting delay to or from signals representative of a predicted conduction time of the SR switches to generate predictive gate drive signals, wherein a falling edge of each of the predictive gate drive signals substantially matches the zero crossing point of current through an associated SR switch.

10. The method of claim 9, wherein the predictive gate drive signals are used to control the conduction state of the SR switches when the switching frequency (fs) of an inverter stage of the resonant converter is at or below a resonant frequency (f0).

11. The method of claim 10, further comprising controlling the conduction state of the SR switches based on a clock signal when fs is above f0.

* * * * *